United States Patent Office 3,501,487
Patented Mar. 17, 1970

3,501,487
CERTAIN HETERO-ARYL LOWER ALKYLENE DERIVATIVES OF 1 - LOWER ALKYL - 2-IMINO-PYRROLIDINES
George Ireland Poos, Ambler, Pa., assignor to McNeil Laboratories, Inc., a corporation of Pennsylvania
No Drawing. Continuation-in-part of application Ser. No. 409,563, Nov. 6, 1964. This application June 29, 1967, Ser. No. 649,867
Int. Cl. C07d 85/38, 57/00
U.S. Cl. 260—296     8 Claims

ABSTRACT OF THE DISCLOSURE

The compounds are of the class of 1-alkyl-2-imino-pyrrolidines bearing a heterocyclic or heterocyclicalkyl substituent on the imino nitrogen, which compounds are useful for their blood pressure lowering activity.

---

This is a continuation-in-part application of my co-pending application, Ser. No. 409,563, filed Nov. 6, 1964, now abandoned.

This invention relates to new chemical compounds and the preparation thereof. More particularly, this invention relates to novel 1-lower alkyl-2-imino pyrrolidines having the formula:

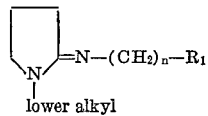

lower alkyl     (I)

wherein $n$ is an integer from zero to 2, $R_1$ represents a heterocyclic selected from the group consisting of a 5-6 ring-membered monocyclo group with 1-2 heteroatoms selected from the group consisting of nitrogen, oxygen and sulfur provided that at least one is nitrogen and a 9-10 ring-membered bicyclo group having as one of the cyclic moieties the aforementioned monocyclo group. The therapeutically active non-toxic acid addition salts of the foregoing compounds are also embraced within the scope of this invention.

As used herein, "lower alkyl" may be straight or branch chained and have from 1 to 7 carbon atoms, such as, for example, methyl, ethyl, propyl, isopropyl, butyl, tert-butyl, pentyl, hexyl, heptyl and the like. Among the heterocyclics that are operable herein are monocyclic groups comprising 5.6 ring members with 1-2 heteroatoms selected from the group consisting of nitrogen, sulfur and oxygen provided that at least one is nitrogen, and condensed bicyclic groups having 9-10 ring members and having, as one of the cyclic moieties, the aforementioned monocyclic group. The other cyclic moiety is, preferably, aromatic in nature, e.g., benzo. Specific examples of suitable heterocyclics are pyrrolyl, pyrrolidinyl, oxazolyl, imidazolyl, pyrazolyl, thiazolyl, thiazolidinyl, pyridyl, piperidyl (including piperidino), morpholinyl (including morpholino), indolyl, quinolyl, isoquinolyl, and the like. Among the preferred heterocyclics are oxazolinyl, pyridyl, indolyl and imidazolinyl. The heterocyclics may be, if so desired, further substituted with such groups as a lower alkyl, aryl, e.g., phenyl, aralkyl, e.g., benzyl and phenethyl, and the like.

The novel compounds of this invention have useful pharmacological properties which make them suitable for pharmaceutical applications. For example, the compounds have been observed to produce a blood pressure lowering effect when administered intravenously to dogs in doses beginning at 1-2 mg./kg. Central nervous system depressant activity has also been observed upon administration to laboratory animals.

The subject compounds (I) may be prepared by reacting a 1-lower alkyl-2-ethoxypyrrolidinium fluoroborate of Formula II with a primary amine (III) having the formula $NH_2\text{---}(CH_2)_n\text{---}R_1$, wherein $n$ and $R_1$ are as previously defined. Stoichiometric quantities of reactants are preferably employed. The starting material (II) may be prepared according to Ber., 89, 2063 (1956). Suitable organic solvents for conducting the reaction include lower aliphatic alcohols, such as, for example, methanol, ethanol, 2-propanol, tert-butanol and the like, and ethers, such as for example, diethylether, tetrahydrofuran, dioxane and the like. The use of a solvent is not critical, however, and, where a particular primary amine reactant is a liquid, none is preferred. Elevated temperatures may be advantageously employed during the reaction. The resulting product (IV), in the form of the fluoroborate salt, is converted to the corresponding base form (I) by conventional means, for example, by treatment with a suitable alkali such as alkali metal or alkaline earth metal hydroxides, carbonates, bicarbonates, acetates and the like. The reactions may be illustrated as follows:

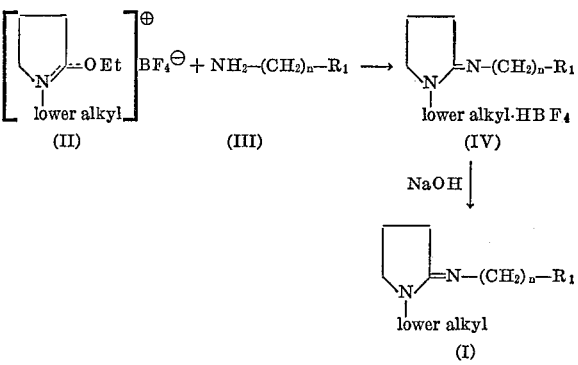

The subject compounds may be isolated as the free bases by synthetic processes normally employed. These compounds, in base form, are convertible to therapeutically active nont-oxic acid addition salts by treatment with an appropriate acid, such as, for example, an inorganic acid, such as, hydrohalic acid, e.g., hydrochloric, hydrobromic, hydroiodic acid; sulfuric or nitric acid; a phosphoric acid; an organic acid, such as acetic, propionic, glycolic, lactic, pyruvic, malonic, succinic, maleic, fumaric, malic, tartaric, citric, benzoic, cinnamic, mandelic, methanesulfonic, ethanesulfonic, hydroxy-ethanesulfonic, benzenesulfonic, p-toluenesulfonic, cyclohexanesulfamic, salicylic, paminosalicylic, 2-phenoxybenzoic, or 2-acetoxybenzoic acid. Conversely, the salt form can be converted in the usual manner into the free base.

The invention may be illustrated by, although not limited to, the following examples.

EXAMPLE I

This example illustrates a method of preparing 2-[(1-lower alkyl-2-pyrrolidinylidene)amino]-4-lower alkyl-5-phenyl-2-oxazolines, by use of appropriate 2-amino-4-(lower alkyl)-5-phenyl-2-oxazolines and 1-lower alkyl-2-ethoxypyrrolidinium fluoborates as starting materials.

(A) 2-[(1 - methyl - 2 - pyrrolidinylidene)amino]-4-methyl-5-phenyl-2-oxazoline.—To 10 grams of 1-methyl-2-ethoxypyrrolidinium fluoborate is added a slurry of 9.7 grams (0.055 mole) of 2-amino-4-methyl-5-phenyl-2-oxazoline in ethanol. After refluxing for ½ hour, the solution is concentrated in vacuo. The resultant oily product is washed twice with ether and then dissolved in methylene chloride. The solution is washed twice with dilute sodium hydroxide and once with water, dried over magnesium sulfate, filtered and concentrated to dryness in vacuo affording 12.2 grams of oily crude product. The oil is dissolved in benzene and chromatographed over basic alumina. The first fractions eluted with petroleum ether and ether were discarded. Second fractions, eluted with chloroform-ether are combined, giving 6.63 grams (47%) of crude 2-[(1-methyl - 2 - pyrrolidinylidene)amino]-4-methyl-5-phenyl-2-oxazoline. Recrystallization from ether-petroleum ether affords the pure oxazoline, M.P. 69.5–70° C.

(B) The procedure of Example I–A is followed, except that an equivalent quantity of the 1-ethyl and 1-butyl derivative of 2-ethoxypyrrolidinium fluoborate is respectively utilized in lieu of the 1-methyl-2-ethoxypyrrolidinium fluoborate used therein to yield as products. 2[(1-ethyl-2-pyrrolidinylidene)amino]-4-methyl-5-phenyl - 2 - oxazoline and 2-[(1-butyl-2-pyrrolidinylidene)amino]-4-methyl-5-phenyl-2-oxazoline, respectively.

EXAMPLE II

2-[2-(1-methyl-2-pyrrolidinylidene)aminoethyl]pyridine 25 grams of 1-methyl-2-ethoxypyrrolidinium fluoborate is allowed to react with 14.6 grams of 2-(2-aminoethyl)-pyridine. On cooling, the reaction mixture crystallizes. Ether is added and the crystals are collected by filtration. The solid is dissolved in methylene chloride and treated with 10 percent sodium hydroxide. The solution is washed once with sodium hydroxide and once with water, dried over magnesium sulfate, filtered and concentrated to dryness in vacuo, giving 23 grams (94%) of crude oily product, 2-[2-(1-methyl-2-pyrrolidinylidene)aminoethyl]pyridine. Purification is accomplished by chromatography over basic alumina. The fractions eluted with ether, chloroform-ether (1:1) and chloroform are combined and the material is converted to its cyclohexanesulfamate salt in acetone-ether; yield, 25.0 grams (54.5%) of pure 2-[2-(1-methyl - 2 - pyrrolidinylidene)aminoethyl]pyridine cyclohexanesulfamate, M.P. 87.5–89° C.

EXAMPLE III (A) 2-[(1 - methyl-2-pyrrolidinylidene)aminomethyl]-pyridine.—To 10.8 grams (0.1 mole) of 2-aminomethylpyridine are added 20 grams of 1-methyl-2-ethoxypyrrolidinium fluoborate. The reaction warms rapidly and is allowed to cool at room temperature. The oily product is washed with ether and dissolved in 10 percent sodium hydroxide. The aqueous solution is extracted 3 times with methylene chloride, and the combined extracts are washed once with water, dried over magnesium sulfate, filtered and concentrated in vacuo. There are obtained 16.7 grams of oily base, which is purified by chromatography over basic alumina. Elution with ether affords 11 grams of oil, which is dissolved in ethanol and treated with 24 grams of perchloric acid. Cooling and dilution affords crystals, which are collected by filtration. Recrystallization from ethanol gives 20.5 grams (52.5%) of pure 2-[(1-methyl-2 - pyrrolidinylidene)aminomethyl]pyridine diperchlorate, M.P. 200–201° C.

(B) The procedure of Example III–A is repeated except that an equivalent quantity of the 1-ethyl and 1-butyl derivative of 2-ethoxypyrrolidinium fluoborate is respectively used in place of the 1-methyl-2-ethoxypyrrolidinium fluoborate used therein to yield as products: 2-[(1-ethyl-2-pyrrolidinylidene)aminomethyl]-pyridine and 2-[(1 - butyl-2-pyrrolidinylidene)aminomethyl]-pyridine, respectively.

EXAMPLE IV

3-[2-(1-methyl-2-pyrrolidinylidene)aminoethyl]indole

Addition of a solution of tryptamine (0.089 mole, 14.2 g.) in ethanol to 20 grams (0.09 mole) of 1-methyl-2-ethoxypyrrolidinium fluoborate affords a vigorous exothermic reaction. The resultant crystalline material is slurried in ether, collected by filtration and dried. The solid is suspended in dilute sodium hydroxide and methylene chloride. The insoluble crystalline base is filtered and dried, affording 17.0 grams of crude base, M.P. 96–105° C. The methylene chloride extract affords an additional 6 grams of solid. The two batches are combined and recrystallized from ethanol, affording 11.8 grams of pure 3-[2-(1-methyl - 2 - pyrrolidinylidene)aminoethyl]indole, M.P. 100–104° C.

EXAMPLE V

This example illustrates a method of preparing 2-lower alkyl-1-[2-(1-lower alkyl - 2 - pyrrolidinylidene)aminoethyl]-imidazolines, by use of appropriate 1-(2-aminoethyl)-2-lower alkyl-imidazolines and 1-lower alkyl-2-ethoxypyrrolidinium fluoborates as starting materials.

(A) 2 - methyl - 1 - [2-(1-methyl-2-pyrrolidinylidene) amino-ethyl]-imidazoline.—To 25 grams of 1-methyl-2-ethoxypyrrolidinium fluoborate are added, portionwise, 15.2 grams (0.12 mole) of 1-(2-aminoethyl)-2-methylimidazoline. After the initial vigorous reaction ceases, the mixture is reflexted for 10 minutes on a steam cone. The oily product is cooled and washed 3 times with ether, dissolved in water, made basic with sodium hydroxide and extracted with methylene chloride. The extracts are dried over magnesium sulfate and concentrated in vacuo, affording 18.9 grams (75.5%) of a dark oil, crude 2 - methyl-1-[2-1-methyl-2-pyrrolidinylidene)amino-ethyl]-imidazoline. The oily base is converted to the dicyclohexanesulfamate salt by treatment with cyclohexanesulfamic acid in acetone. Recrystallization from acetone gives 14.2 grams of 2-methyl-1-[2-(1-methyl-2-pyrrolidinylidene)aminoethyl]imidazoline dicyclohexanesulfamate, M.P. 136d137° C.

(B) By repeating the procedure of Example V–A, except that an equivalent quantity of 1-(2-aminoethyl)-2-ethylimidazoline is utilized in place of the 1-(2-aminoethyl)-2-methylimidazoline used therein, there is obtained 2 - ethyl-1-[2-(1-methyl-2-pyrrolidinylidene)aminoethyl] imidazoline.

(C) An equivalent quantity of the 1-ethyl derivative of 2-ethoxypyrrolidinium fluoborate is used in lieu of the 1-methyl derivative in the procedure of Example V–A to yield 2 - methyl - 1 - [2-(1-ethyl-2-pyrrolidinylidene) aminoethyl]imidazoline as the resulting product.

What is claimed is:

1. A chemical compound selected from the group consisting of a 1-alkyl-2-imino-pyrrolidine having the formula:

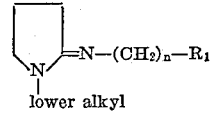

lower alkyl and the therapeutically active acid addition salts thereof, wherein $n$ is an integer from zero to 2, and $R_1$ is a heterocyclic selected from the group consisting of oxazolinyl, pyridyl, indolyl and imidazolinyl.

2. 2 - [1 - (lower alkyl-2-pyrrolidinylidene)amino]-4-lower alkyl-5-phenyl-2-oxazoline.

3. The compound of claim 2 wherein said lower alkyl is methyl.

4. The compound of claim 1 which is 2-[2-(1-methyl-2-pyrrolidinylidene)aminoethyl]pyridine.

5. The compound of claim 1 which is 2-[(1-methyl-2-pyrrolidinylidene)aminomethyl]pyridine.

6. The compound of claim 1 which is 3-[2-(1-methyl-2-pyrrolidinylidene)aminoethyl]indole.

7. 2-lower alkyl-1-[2-(1-lower alkyl-2-pyrrolidinylidene)aminoethyl]imidazoline.

8. The compound of claim 7 wherein said lower alkyl is methyl.

References Cited

UNITED STATES PATENTS 3,067,206  12/1962  Kralt et al. _____ 260—326.15

HENRY R. JILES, Primary Examiner

A. L. ROTMAN, Assistant Examiner

U.S. Cl. X.R.

260—247.1, 247.2, 247.5, 268, 293, 293.4, 294, 294.8, 295, 286, 288, 302, 307, 309, 309.6, 310, 326.12, 326.13, 326.15, 999